United States Patent [19]

Janjua et al.

[11] 4,085,016
[45] Apr. 18, 1978

[54] METHOD AND APPARATUS FOR THE OXIDATION OF ORGANIC MATERIAL PRESENT IN CONCENTRATED SULFURIC ACID

[75] Inventors: Mohammad Barakat Ilahi Janjua, Pincourt; Pierre L. Claessens, St. Eustache; Raouf O. Loutfy, Pierrefonds, all of Canada

[73] Assignee: Noranda Mines Limited, Toronto, Canada

[21] Appl. No.: 732,437

[22] Filed: Oct. 14, 1976

[30] Foreign Application Priority Data

Jul. 20, 1976   Canada .................................. 257399

[51] Int. Cl.[2] ........................... C25B 1/22; C25B 9/00
[52] U.S. Cl. ..................................... 204/104; 204/149; 204/262; 204/263; 204/274; 204/275
[58] Field of Search ................. 204/104, 149, 98, 128, 204/290 F, 262-263, 274-275

[56] References Cited

U.S. PATENT DOCUMENTS

| 2,967,807 | 1/1961 | Osborne et al. | 204/128 |
| 3,092,566 | 6/1963 | Negus | 204/240 |
| 3,361,663 | 1/1968 | Murray et al. | 204/149 |
| 3,563,879 | 2/1971 | Richards et al. | 204/149 |
| 3,676,325 | 7/1972 | Smith et al. | 204/290 F |
| 3,917,521 | 11/1975 | Clarke et al. | 204/104 |

Primary Examiner—R. L. Andrews
Attorney, Agent, or Firm—Spencer & Kaye

[57] ABSTRACT

A method for the oxidation of organic material present in concentrated sulfuric acid is disclosed. The method comprises the steps of diverting a portion of a concentrated sulfuric acid stream, diluting the diverted stream with water to about 40-70% sulfuric acid concentration, passing the diluted stream through an electrolysis apparatus to oxidize some of the sulfuric acid to form a predetermined quantity of peroxosulfuric acids, and returning the diverted stream back to the main stream to oxidize the organic material and decolorize the main stream of concentrated sulfuric acid.

13 Claims, 7 Drawing Figures

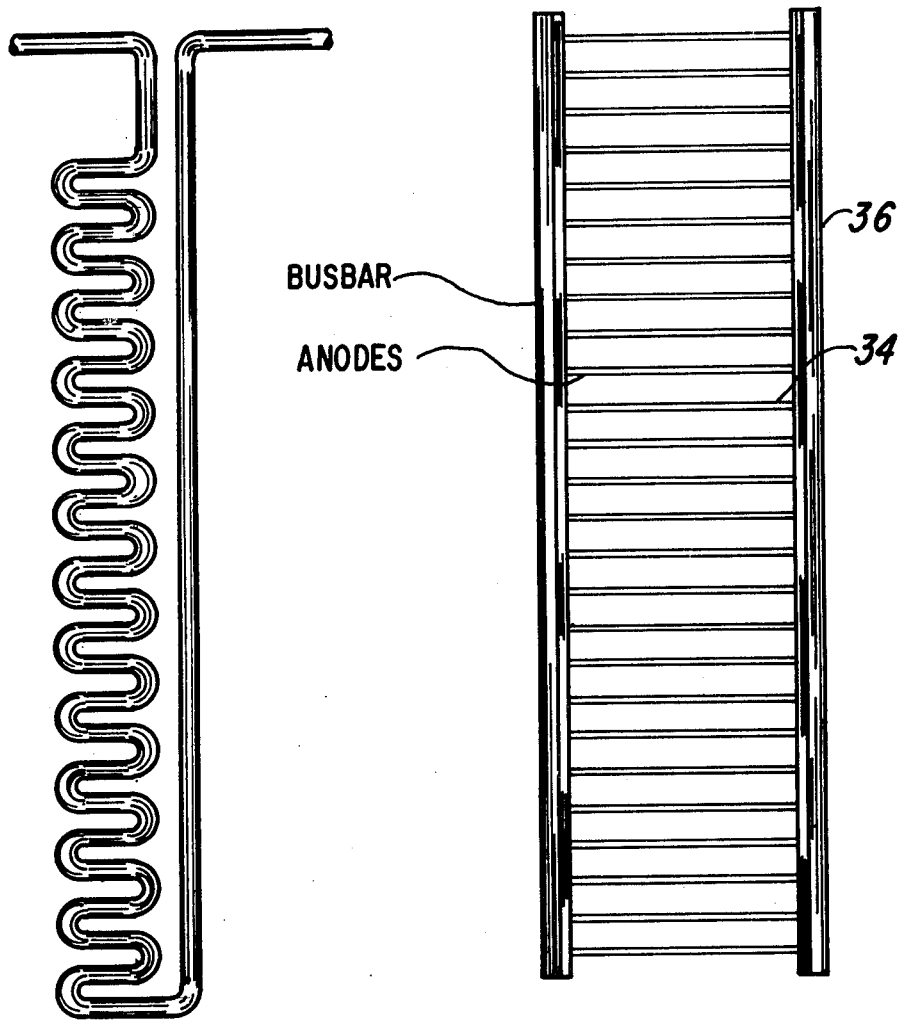

METHOD AND APPARATUS FOR THE OXIDATION OF ORGANIC MATERIAL PRESENT IN CONCENTRATED SULFURIC ACID

This invention relates to the oxidation of organic material present in concentrated sulfuric acid, more particularly sulfur acid obtained as a by-product of sulfide ore roasting.

In the production of sulfuric acid from sulfur dioxide gas obtained during roasting of sulfide ores, the presence of organic material in the concentrated acid is often encountered and is responsible for a brown or black coloration of the acid which is an obvious drawback for its commercialization.

A known method of destroying the organic impurities is the action of strong oxidizing agents to convert the organics into water and carbon dioxide gas. The only acceptable oxidizing agents are those whose reduction products do not add any other impurities in the acid. Hydrogen peroxide is one example of such a compound which is by reduction converted into water and oxygen. Hydrogen peroxide is indeed used industrially to oxidize the organic materials present in concentrated sulfuric acid. However, the relative instability of hydrogen peroxide solutions poses problems of handling and storage. Another series of oxidizing agents which could be used for the oxidation of organic material is the family of peroxy-compounds of sulfuric acid (peroxosulfuric acids) including the best characterized peroxydisulfuric acid ($H_2S_2O_8$, commonly called persulfuric acid) and peroxomonosulfuric acid ($H_2SO_5$, sometimes called permonosulfuric acid), which decomposes upon reduction to sulfuric acid and hydrogen peroxide and finally water and oxygen. These compounds are even more unstable than hydrogen peroxide and cannot be stored for prolonged periods of time.

To avoid the problems of handling, storage or possible short-supply of viable oxidizing agents to be used for the oxidation of organic materials in industrial sulfuric acid, it is proposed, in accordance with the present invention, to produce the peroxosulfuric acids by direct electrochemical oxidation of a small diverted portion of the acid to be treated.

The process, in accordance with the invention, comprises the steps of diverting a portion of a main concentrated sulfuric acid stream, diluting the diverted stream with water to about 40–70% sulfuric acid concentration, passing the diluted stream through an electrolysis apparatus to oxidize some of the sulfuric acid to form a predetermined quantity of peroxosulfuric acids, and returning the diverted stream containing such predetermined quantity of peroxosulfuric acids to the main stream to oxidize the organic material and decolorize the main stream.

The portion of the concentrated sulfuric acid diverted from the main stream is preferably diluted to about 50%. The dilution of the sulfuric acid generates heat and the solution is preferably cooled to room temperature.

The concentration of peroxosulfuric acids needed depends on the amount of organic material in the main stream of sulfuric acid. It has been found that it is possible to generate a concentration of peroxosulfuric acids in the range of 230 gpl to 500 gpl, generally about 360 gpl, from a 50% concentration of sulfuric acid at a temperature of 12° C using preferred anodes to be fully disclosed later in the description. When the content of organic material in the main stream is equivalent to about 150 ppm carbon, it has been found that the portion of the main stream to be diverted is about 0.1 to 0.3%.

The apparatus for the on-site generation of peroxosulfuric acids comprises means for diverting a portion of a main stream of concentrated sulfuric acid, means for adding water to such diverted stream of concentrated sulfuric acid to dilute it to about 40 to 70%, means for passing such diluted stream into an electrolytic apparatus at a predetermined flow rate to oxidize some of the sulfuric acid and form a predetermined quantity of peroxosulfuric acids, and means for returning the diverted stream with such predetermined quantity of peroxosulfuric acids back to the main stream to oxidize the organic material and decolorize the main stream.

The apparatus preferably includes a mixing and cooling tank wherein water is added to dilute the concentrated sulfuric acid to preferably about 50%. The dilution of the sulfuric acid generates heat and the solution in the tank is preferably cooled to room temperature.

A preferred electrolytic apparatus comprises at least one cell through which is circulated a 50% sulfuric acid, an anode assembly suspended vertically in the center of the cell and consisting of a plurality of horizontal insoluble anodes mounted between two copper busbars which are coated with a protective coating to prevent anodic dissolution, a microporous membrane sheet placed on each side of the anodes to form an anolyte chamber, and two cathodes one on each side of the anode assembly.

The anodes may be made of pure platinum wires, platinum wires wrapped around titanium rods, metal substrates electroplated with platinum from conventional platinum solutions, or metal substrates cladded with platinum. However, it has been found to be particularly advantageous, from a corrosion point of view, to use anodes made of a valve metal substrate consisting of titanium, tantalum, or niobium, preferably titanium, which is painted with at least one chemical compound of precious metals preferably platinum or iridium, which is capable of decomposing upon firing to provide an under-layer containing the precious metal or an oxide thereof. The coating is then fired to produce such an under-layer and subsequently electroplated with a conventional sodium hexahydroplatinate bath to provide an average platinum coating thickness of 2.5 to 10 microns.

The cathodes are preferably constructed from copper cooling coils electroplated with lead. This permits circulation of a cooling medium to cool the sulfuric acid in the cell to temperatures of between 0° and 20° C, preferably between 10° and 15° C.

The porous membranes used to separate the anolyte from the catholyte compartments may be made of porous ceramics, ion exchange membranes, hydrophilic porous polypropylene membranes, porous PVC/vinyl acetate copolymer membranes, or microporous PVC membranes. Of the above membranes, microporous PVC membranes are preferred since they exhibit the lowest internal electrical resistance.

The invention will now be disclosed with reference to the accompanying drawings which illustrate a preferred embodiment of the invention and in which:

FIG. 3 illustrates the anode used in the cell of FIG. 2;

FIG. 4 illustrates the cathode used in the cell of FIG. 2;

Figure 1:
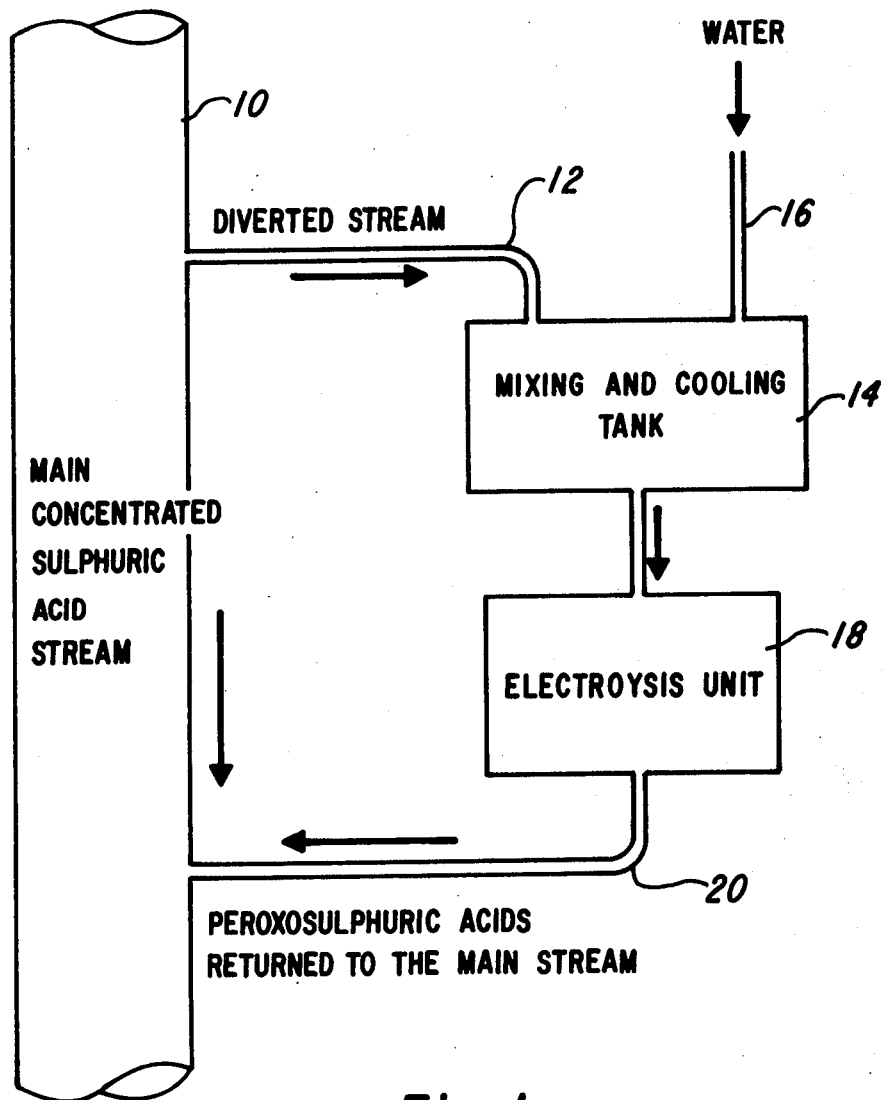
FIG. 1 illustrates a schematic flowsheet of the process for decolorization of concentrated sulfuric acid.

Referring to FIG. 1, there is shown a schematic flowsheet of the process for decolorization of concentrated sulfuric acid. A portion of the main concentrated sulfuric acid stream 10 is diverted through pipe 12 to a mixing and cooling tank 14 wherein it is diluted to approximately 40–70%, preferably 50% concentration with water fed through pipe 16. The tank is cooled by any convenient means to about room temperature to remove the heat generated during dilution of the concentrated sulfuric acid with water. The content of the tank is passed through an electrolysis unit 18 wherein part of the sulfuric acid is oxidized to form a predetermined concentration of peroxosulfuric acids. The solution with the appropriate concentration of peroxosulfuric acids is diverted back, through pipe 20, to the main stream 10 wherein oxidation of the organic impurities and decolorization of the sulfuric acid stream take place. The above process may be performed continuously or semi-continuously.

The optimum sulfuric acid concentration for the formation of peroxosulfuric acids by electrolysis is known in the literature (Mantell C. L. Electrochemical Engineering, McGraw-Hill 1960, page 326) and should be between 40 to 70%, preferably about 50%. Therefore, the portion of the main stream diverted through pipe 12 is mixed with water to attain the required concentration. It is also known that the optimum temperature for the formation of peroxsulfuric acids from sulfuric acid by electrolysis is from 5° to 20° C, preferably between about 10° and 15° C. Therefore, the diverted stream is cooled to about room temperature in the mixing and cooling tank 14 and further cooled in the electrolysis unit.

The amount of peroxosulfuric acids required to oxidize the organic material depends upon the organic material content of the main stream. The higher the organic material content the higher the amount of peroxosulfuric acids required. Using a sample of a so-called "black" sulfuric acid produced at Gaspe Copper Mines and having about 145 ppm carbon in it, the amount of peroxosulfuric acids required to decolorize one ton per day of the acid to a final APHA color of 200 (very slight yellow) after 7.5 days of contact, was found to be about 830 g. Based on a peroxosulfuric acids concentration in the range of 230 gpl to 500 gpl, typically 360 gpl for a concentration of 50% sulfuric acid at a temperature of 12° C and using a preferred anode assembly to be disclosed later, it has been found that the volume of black acid to be diverted from a main stream of 1200 tons of black acid per day would be about 2.3 tons or 0.19%. Of course, this depends very much on the concentration of peroxosulfuric acids generated and more particularly the type of anodes used in the electrolytic unit. The portion of the black acid to be diverted will normally be in the range of 0.1 to 0.3% for a carbon content in the black acid of the order of 100 to 200 ppm.

The rate of formation of peroxosulfuric acids has been found to be directly proportional to the cell current. However, the maximum cell current for a given anolyte volume is limited by the amount of heat generated due to the anode, electrolyte and membrane resistances, which for too high currents may cause problems in cooling. It has been found that high current densities should be used to minimize the number of anodes per given volume of anolyte and, therefore, decrease the cost. However, high current densities, beside the problem of heat generation due to the anode resistance as mentioned above, have the possible disadvantage of high rate of corrosion of the platinum which could consequently increase the maintenance and replacement cost. It has been found that the current density should be in the range of 50 to 200 ASD, preferably 75–150 ASD.

Figures 2, 7:
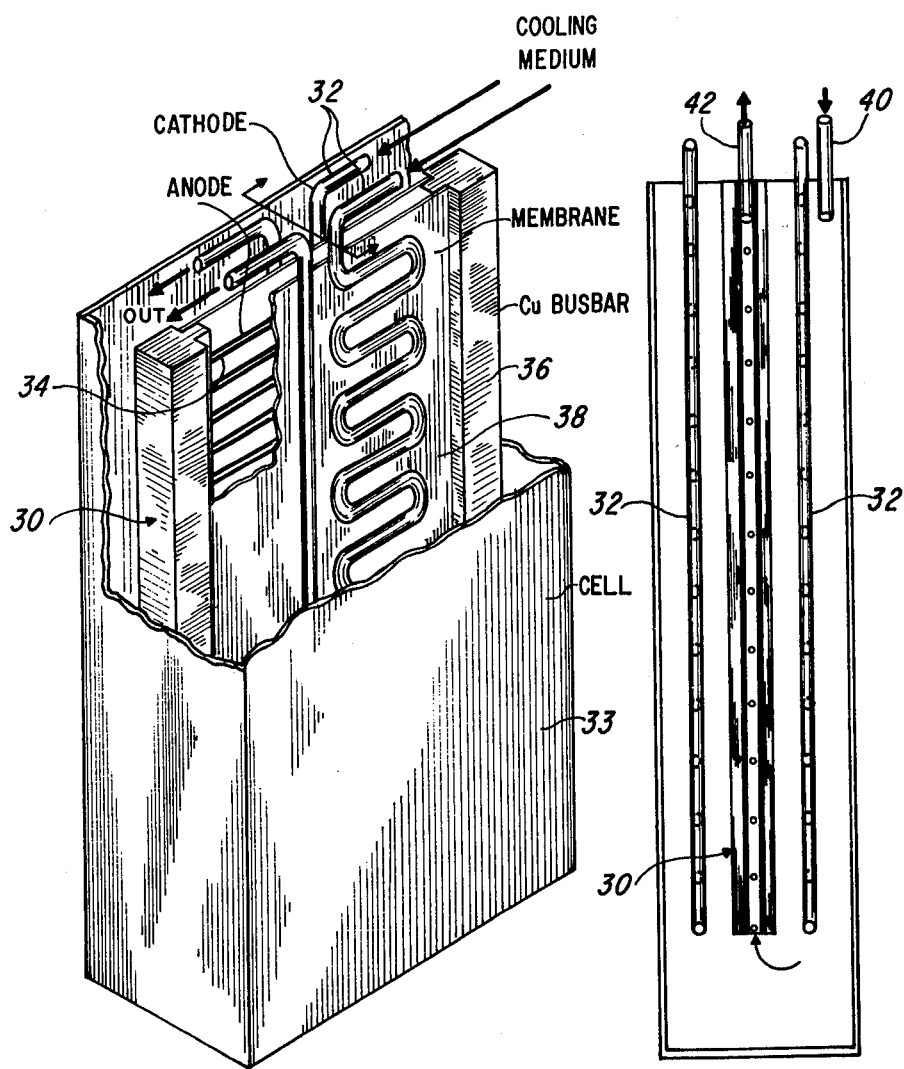
FIG. 2 illustrates a perspective view of a cell used in the electrolysis apparatus.
FIG. 7 is a section view through the cell of FIG. 2 illustrating the circulation of sulfuric acid through the cell.

FIG. 2 illustrates a schematic diagram of a preferred electrolytic cell, the number of such cell being used in the electrolysis unit of FIG. 1 depending on the amount of concentrated sulfuric acid to be treated, on the organic material content of the sulfuric acid stream, and on the efficiency of the cells. Each cell consists of an anode assembly 30 and a cathode 32 located one on each side of the anode assembly 30. The anode and cathode assemblies are placed in a PVC housing 33 having a height of about 100 cm, a depth of about 12 cm and a width of about 10 cm. The anode assembly is best seen in FIG. 3 and consists of 30 equally spaced horizontal anodes 34 having a length of about 11.5 cm and a diameter of about 0.4 cm. The extremities of each anode are preferably press-fitted within two copper busbars 36 having a cross section of about 1.3 cm. A protective coating, such as Amercoat 545-B, is applied to the busbars in four layers, each layer being allowed to dry thoroughly before the subsequent layer is applied. This coating is used to prevent anodic dissolution of the copper busbars during operation of the cell. A PVC microporous membrane sheet 38 preconditioned in 50% sulfuric acid for two weeks is placed on each side of the anode using PVC cement to enclose the anode assembly and form an anolyte chamber. Other porous membranes could be used such as porous ceramics, ion exchange membranes, hydrophilic porous polypropylene membranes, porous PVC/vinyl acetate co-polymer membranes, but it has been found that the PVC microporous membranes exhibit the lowest internal electrical resistance. An anode material having a high rate of electrochemical generation of peroxosulfuric acids and a surprisingly low rate of corrosion of its outer coating was found to be a valve metal substrate (Ti, Ta or Nb), preferably Ti, which was painted with a coating of at least one chemical compound of precious metal (Pt or Ir), preferably platinum, capable of decomposing upon firing. This coating, upon firing, provides an under-layer containing the precious metal or an oxide thereof, or both. This under-layer is then electroplated with the conventional sodium hexahydroplatinate bath to provide an average platinum coating thickness of 2.5 – 10 microns. The process for making the above electrode is disclosed in Canadian Pat. No. 936,836 issued Nov. 13, 1973. The substrate could be a solid rod as disclosed above or a sheet of the valve metal or a copper-cored valve metal cladded rod or sheet. The anode could also be tubular with solid valve metal walls or a copper tube cladded with valve metal. This last arrangement will allow cooling of the anodes while under electrolysis, with expected high rate of peroxosulfuric acids formation.

Other anodes could also be used but they have been found to have higher corrosion rates. Such anodes may be pure platinum wires, platinum wires wrapped around titanium rods, metal substrates electroplated with platinum from conventional platinum solutions, or metal substrates cladded with platinum. The above disclosed preferred anode material differs in that it has an underlayer of platinum or platinum oxide added by the fire decomposition of a platinum salt that is decomposable. The surprising difference between the preferred anodes and the other anodes are as follows:

(1) The corrosion rate of the preferred anodes is considerably lower than any of the conventional anodes as illustrated in the following Table:

TABLE I

RATES OF CORROSION OF VARIOUS Pt ANODES IN 50% SULFURIC ACID DURING THE ELECTROCHEMICAL GENERATION OF PEROXOSULFURIC ACIDS

| Anode | Corrosion Rates (micron/year) |
|---|---|
| Preferred Anode | 0.5 |
| Ti Cladded with Pt | 1.7 |
| Pure, Pt Wire | 3.5 |
| Conventional Electroplated Pt | 3.1 |

It is apparent from the above that the corrosion of the platinum coating of the preferred anodes is about 7–7.5 times lower than the corrosion rate of the platinum wire anodes, and 3–4 fold lower than that of the titanium anodes cladded with platinum.

Figure 5:
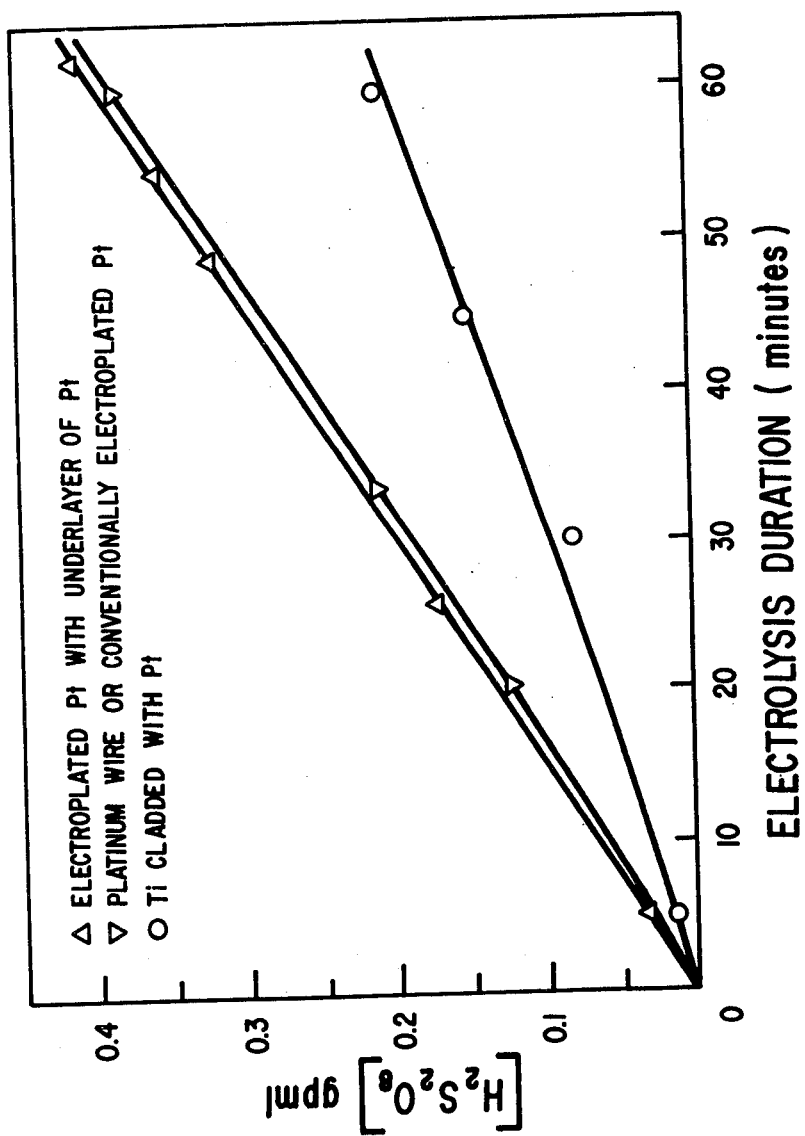
FIG. 5 illustrates the variation in concentration of peroxosulfuric acids produced as a function of time using various anodes.
Figure 6:
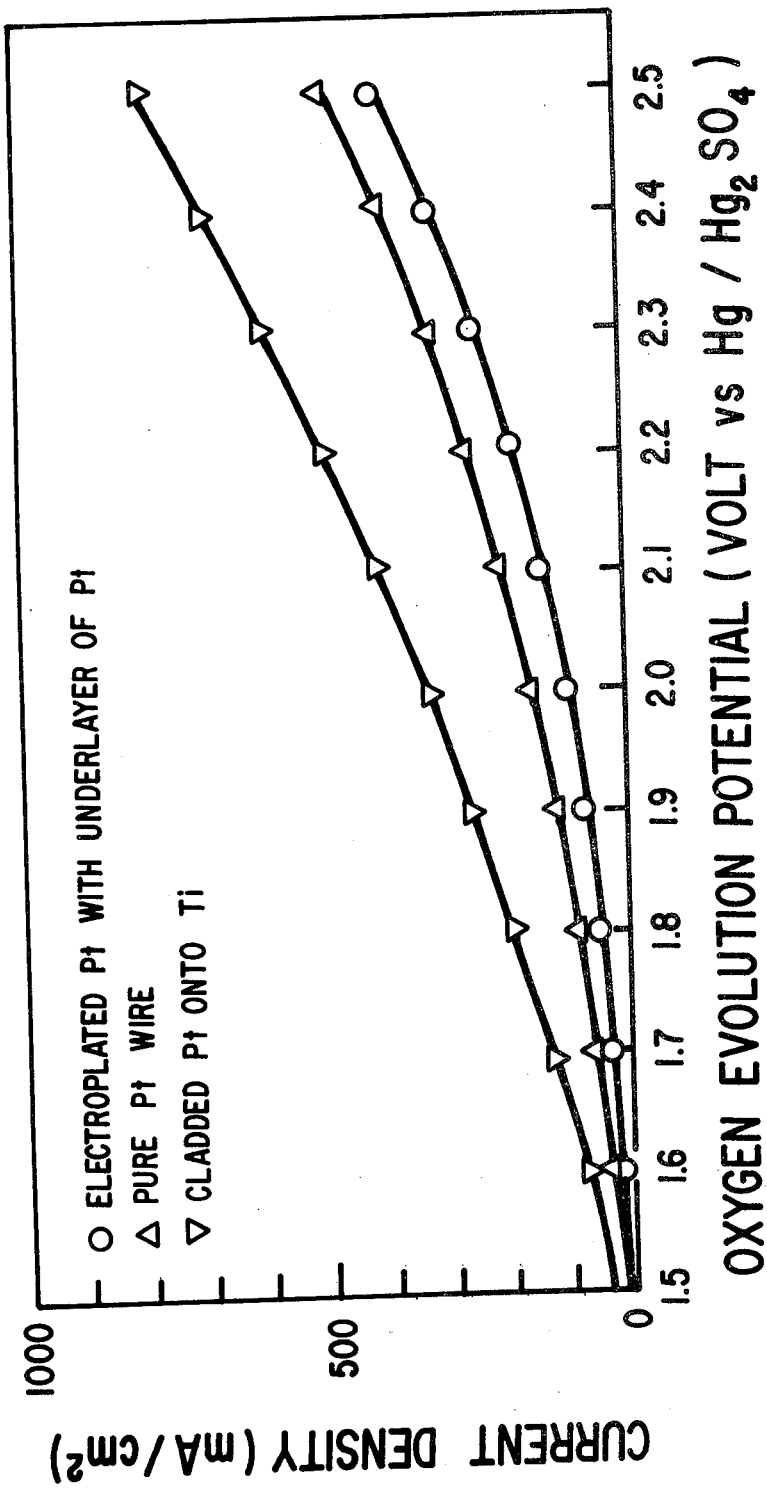
FIG. 6 is a graph illustrating the oxygen evolution potential of various anodes used in the cell.

(2) It is also apparent from FIG. 5, which shows the variation in concentration of peroxosulfuric acids produced as a function of time with various anodes, that the rate of formation of peroxosulfuric acids using the preferred anodes is at least equivalent to that obtained using pure platinum wire or conventionally electroplated platinum. However, their corrosion rates are substantially lower (about 7 times lower as mentioned above). The use of the preferred anodes also results in almost double the rate of peroxosulfuric acids formation compared to the titanium cladded with platinum anodes and also they have a lower corrosion rate than these anodes (about 3 times lower). This higher rate of peroxosulfuric acid generation is believed to be due to the higher oxygen evolution potential of the preferred anode as compared to the titanium cladded with platinum anodes as illustrated in FIG. 6.

In operation, the 50% sulfuric acid is fed into the cathodic compartment through pipe 40 and flows up into the anodic compartment through a hole in the bottom of the anode assembly as illustrated in FIG. 7. The 50% sulfuric acid flows out the cell through pipe 42. The anolyte temperature is maintained at about 11° C through circulation of a cooling medium through the cathode as illustrated in FIG. 2. A preferred cooling medium is a mixture of water and alcohol to prevent freezing of the cooling medium at temperatures below 0° C which may be required to cool the anolyte to the desired temperature.

The optimum flow rate of the 50% sulfuric acid to produce, for example, 360 gpl of peroxosulfuric acids was found to be about 200 ml/min. using a cell having the dimensions given above. This flow rate produces about 70 g/min. of peroxosulfuric acids per cell or about 100 kg/day. Thus, to decolorize 1200 tons per day of black acid, 10 cells would be required. Of course, if lower efficiency anodes are used, then a larger number of cells would be required.

It is to be understood that the present invention is not limited to the use of the preferred anode assembly disclosed in the present application. For example, other anode systems such as the one disclosed in U.S. Pat. No. 2,795,541 could also be suitable. The advantage of the cell used by the applicant is its high rate of formation of peroxosulfuric acids per actual unit volume of cell, i.e. the compactness of the cell compared to the conventional electrolytic cells used commercially.

Although the invention has been disclosed with respect to a preferred embodiment thereof, it is to be understood that various modifications may be made to such embodiment and that the invention is to be limited by the scope of the claims only.

What is claimed is:

1. A method for the on-site generation of peroxosulfuric acids for the oxidation of organic materials in concentrated sulfuric acid comprising the steps of:
   (a) diverting a portion of main concentrated sulfuric acid stream;
   (b) diluting the diverted stream with water to about 40–70% sulfuric acid concentration;
   (c) passing the diluted stream at a temperature between 5° and 20° C through an electrolysis apparatus operated at a current density between 50 and 200 ASD to oxidize some of the sulfuric acid to form a predetermined quantity of peroxosulfuric acids; and
   (d) returning the diverted stream with said predetermined quantity of peroxosulfuric acids to the main stream to oxidize the organic materials and decolorize the main stream of sulfuric acid.

2. A method as defined in claim 1, wherein said concentrated sulfuric acid is diluted to about 50% concentration before electrolysis.

3. A method as defined in claim 1, wherein the diverted stream is cooled to about 5° to 20° C room temperature before electrolysis.

4. A method as defined in claim 3, wherein the diverted stream is cooled to about 10° to 15° C before electrolysis.

5. A method as defined in claim 1, wherein the portion of the main stream which is diverted is about 0.1 to 0.3% for oxidation of an organic material content equivalent to 100 to 200 ppm carbon in the main stream using an electrolytic apparatus capable of producing a concentration of peroxosulfuric acids in a range of 230 to 500 gpl.

6. A system for the on-site generation of peroxosulfuric acids for the oxidation of organic materials in concentrated sulfuric acid comprising:
   (a) means for diverting a portion of a main stream of concentrated sulfuric acid;
   (b) means for adding water to said diverted sulfuric acid stream to dilute it to about 40–70%.
   (c) means for passing said diluted stream at a predetermined flow rate and at a temperature between 5° and 20° C into an electrolytic apparatus operated at a current density between 50 and 200 ASD to oxidize some of the sulfuric acid and form a predetermined quantity of peroxosulfuric acids; and
   (d) means for returning the diverted stream with said predetermined quantity of peroxosulfuric acids back to the main stream to oxidize the organic materials and attain decolorization of the main stream of sulfuric acid.

7. A system as defined in claim 6, wherein said electrolysis apparatus comprises at least one electrolytic cell, an anode assembly suspended vertically in the center of said cell and consisting of a plurality of insoluble horizontal anodes mounted between two copper busbars which are coated with a protective coating to prevent anodic dissolution, a porous membrane placed on each side of the anodes to form an anolyte chamber, and two cathodes placed one on each side of the anode assembly.

8. A system as defined in claim 7, wherein said cathodes are made of copper cooling coils electroplated with lead.

9. A system as defined in claim 8, further comprising means for circulating a cooling medium through the cathodes to cool the sulfuric acid in the cell to about 5° to 20° C.

10. A system as defined in claim 7, wherein the porous membrane is selected from the group consisting of porous ceramic, ion exchange membranes, hydrophilic porous polypropylene membranes, porous PVC/vinyl acetate membranes and microporous PVC membranes.

11. A system as defined in claim 10, wherein said membrane is a microporous PVC membrane.

12. A system as defined in claim 7, wherein the anodes are selected from the group consisting of pure platinum wires, platinum wires wrapped around titanium rods, platinum electroplated metal substrates, metal substrates cladded with platinum, or valve metal substrates covered with an under-layer of precious metal and/or oxide thereof and electroplated with platinum.

13. A system as defined in claim 6, further comprising a mixing and cooling tank wherein water is added to dilute the concentrated sulfuric acid and cool it to about room temperature.

* * * * *